(12) United States Patent
Fuglevand

(10) Patent No.: US 6,630,259 B2
(45) Date of Patent: *Oct. 7, 2003

(54) FUEL CELL POWER SYSTEM PERFORMING AC INVERSION, METHOD OF DISTRIBUTING AC POWER, AND METHOD OF OPERATING A FUEL CELL POWER SYSTEM

(75) Inventor: William A. Fuglevand, Spokane, WA (US)

(73) Assignee: Avista Laboratories, Inc., Spokane, WA (US)

( * ) Notice: Subject to any disclaimer, the term of this patent is extended or adjusted under 35 U.S.C. 154(b) by 274 days.

This patent is subject to a terminal disclaimer.

(21) Appl. No.: 09/864,409

(22) Filed: May 23, 2001

(65) Prior Publication Data

US 2002/0177015 A1 Nov. 28, 2002

(51) Int. Cl.$^7$ .......................... H01M 8/00; H01M 8/04; H01M 8/12
(52) U.S. Cl. .............................. 429/13; 429/22; 429/23
(58) Field of Search ............................ 429/12, 13, 17, 429/22, 23

(56) References Cited

U.S. PATENT DOCUMENTS

| | | |
|---|---|---|
| 3,498,844 A | 3/1970 | Sanderson |
| 3,507,702 A | 4/1970 | Sanderson |
| 3,528,858 A | 9/1970 | Hodgdon, Jr. et al. |
| 3,623,913 A | 11/1971 | Adlhart et al. |
| 3,964,930 A | 6/1976 | Reiser |
| 3,969,145 A | 7/1976 | Grevstad et al. |
| 4,192,906 A | 3/1980 | Maru |
| 4,276,355 A | 6/1981 | Kothmann et al. |
| 4,469,579 A | 9/1984 | Covitch et al. |
| 4,661,411 A | 4/1987 | Martin et al. |
| 4,769,297 A | 9/1988 | Reiser et al. |
| 4,795,536 A | 1/1989 | Young et al. |
| 4,795,683 A | 1/1989 | McElroy |
| 4,797,185 A | 1/1989 | Polak et al. |
| 4,818,637 A | 4/1989 | Molter et al. |
| 4,826,741 A | 5/1989 | Aldhart et al. |
| 4,826,742 A | 5/1989 | Reiser |
| 4,876,115 A | 10/1989 | Raistrick |
| 4,988,582 A | 1/1991 | Dyer |
| 5,084,144 A | 1/1992 | Reddy et al. |
| 5,132,193 A | 7/1992 | Reddy et al. |
| 5,242,764 A | 9/1993 | Dhar |
| 5,318,863 A | 6/1994 | Dhar |
| 5,601,936 A | 2/1997 | Dudfield et al. |
| 5,621,607 A | 4/1997 | Farahmandi et al. |
| 5,738,919 A | 4/1998 | Thomas et al. |
| 5,783,928 A | 7/1998 | Okamura |
| 5,814,970 A | 9/1998 | Schmidt |
| 5,821,729 A | 10/1998 | Schmidt et al. |
| 6,030,718 A | 2/2000 | Fuglevand et al. |
| 6,096,449 A | 8/2000 | Fuglevand et al. |
| 6,266,576 B1 | 7/2001 | Okada et al. |
| 6,497,974 B2 * | 12/2002 | Fuglevand .................. 429/22 |
| 2002/0177018 A1 * | 11/2002 | Fuglevand .................. 429/22 |
| 2002/0177021 A1 * | 11/2002 | Fuglevand .................. 429/23 |

FOREIGN PATENT DOCUMENTS

| | | |
|---|---|---|
| JP | 04-004761 | 1/1992 |
| JP | 08-222258 | 8/1996 |

OTHER PUBLICATIONS

U.S. patent application Ser. No. 09/577,407, Fuglevand et al., filed May 17, 2000.

* cited by examiner

Primary Examiner—Randy Gulakowski
Assistant Examiner—Donald V. Scaltrito
(74) Attorney, Agent, or Firm—Wells St. John P.S.

(57) ABSTRACT

A fuel cell power system, comprising a fuel cell which generates DC voltage; a plurality of energy storage devices selectively electrically coupled with the fuel cell; and circuitry for sequentially selectively electrically coupling and decoupling the respective energy storage devices to a load in a manner which approximates a voltage sine wave.

51 Claims, 5 Drawing Sheets

FUEL CELL POWER SYSTEM PERFORMING AC INVERSION, METHOD OF DISTRIBUTING AC POWER, AND METHOD OF OPERATING A FUEL CELL POWER SYSTEM

TECHNICAL FIELD

The present invention relates to fuel cell power generating systems, and to methods of providing electrical power to a load, or to loads at different voltages from a fuel cell power system.

BACKGROUND OF THE INVENTION

Fuel cells are well known in the art. A fuel cell is an electrochemical device which reacts a fuel and an oxidant to produce electricity and water. A typical fuel supplied to a fuel cell is hydrogen, and a typical oxidant supplied to a fuel cell is oxygen (or ambient air). Other fuels or oxidants can be employed depending upon the operational conditions.

The basic process in a fuel cell is highly efficient, and for those fuel cells fueled directly by hydrogen, pollution free. Further, since fuel cells can be assembled into stacks of various sizes, power systems have been developed to produce a wide range of electrical power outputs and thus can be employed in numerous industrial applications. The teachings of prior art patents, U.S. Pat. Nos. 5,242,764; 6,030,718; 6,096,449, are incorporated by reference herein.

A fuel cell produces an electromotive force by reacting fuel and oxygen at respective electrode interfaces which share a common electrolyte. For example, in PEM fuel cells, the construction of same includes a proton exchange membrane which acts not only as an electrolyte, but also as a barrier to prevent the hydrogen and oxygen from mixing. One commercially available proton exchange membrane is manufactured from a perfluorcarbon material which is marketed under the trademark Nafion, and which is sold by the E. I. DuPont de Nemours Company. Proton exchange membranes may also be purchased from other commercial sources. As should be understood, the proton exchange membrane is positioned between, and in contact with, the two electrodes which form the anode and cathode of the fuel cell.

In the case of a proton exchange membrane (PEM) type fuel cell, hydrogen gas is introduced at a first electrode (anode) where it reacts electrochemically in the presence of a catalyst to produce electrons and protons. The electrons are circulated from the first electrode to a second electrode (cathode) through an electrical circuit which couples these respective electrodes. Further, the protons pass through a membrane of solid, polymerized electrolyte (a proton exchange membrane or PEM) to the second electrode (cathode). Simultaneously, an oxidant, such as oxygen gas, (or air), is introduced to the second electrode where the oxidant reacts electrochemically in the presence of the catalyst and is combined with the electrons from the electrical circuit and the protons (having come across the proton exchange membrane) thus forming water. This reaction further completes the electrical circuit.

The following half cell reactions take place:

$$H_2 \rightarrow 2H^+ + 2e^- \quad (1)$$

$$(\tfrac{1}{2}) O_2 + 2H^+ + 2e^- \rightarrow H_2O \quad (2)$$

As noted above the fuel-side electrode is designated as the anode, and the oxygen-side electrode is identified as the cathode. The external electric circuit conveys the generated electrical current and can thus extract electrical power from the cell. The overall PEM fuel cell reaction produces electrical energy which is the sum of the separate half cell reactions occurring in the fuel cell less its internal losses.

Experience has shown that a single PEM fuel cell produces a useful voltage of only about 0.45 to about 0.7 volts D.C. under a load. In view of this, practical PEM fuel cell power plants have been assembled from multiple cells stacked together such that they are electrically connected in series. Prior art fuel cells are typically configured as stacks, and have electrodes in the form of conductive plates. The conductive plates come into contact with one another so the voltages of the fuel cells electrically add in series. As would be expected, the more fuel cells that are added to the stack, the greater the output voltage.

A typical fuel cell power plant includes three major components: a fuel processor, a fuel cell stack, and a power conditioner. The power conditioner includes a number of components including an invertor for converting DC into a 60 Hz AC wave.

A shortcoming with the prior art methods and devices utilized heretofore relates to features which are inherent in their individual designs. For example, fuel cells have been constructed, heretofore, into stack arrangements, the stacks having a predetermined output based upon the number of fuel cells placed together into the stack. In this configuration, there has been no convenient method, apart from controlling the fuel and oxidant supplies to the respective fuel cells, whereby the output of the individual fuel cells within the stack could be accurately and conveniently controlled.

Yet further, fuel cells of the design noted above are relatively slow to respond to increased load demands. For example, when a fuel cell is used in a power distribution system, loads may vary over time. At some times, there may be increased demands, so called "spikes" in the load. Because a certain amount of time is usually required to start up a fuel cell stack, additional fuel cell stacks or fuel cell subsystems cannot be instantaneously brought on-line to produce sufficient power to handle these substantially instantaneous spikes in the load. At the same time, a spike in the load that results in an on-line fuel cells capacity being exceeded can potentially damage components of the fuel cell. Thus, fuel cell overcapacity has been provided in prior art systems in order to handle short temporary spikes in the load. This type of design is inefficient and wasteful for obvious reasons.

Fuel cells have, from time to time, been used in conjunction with charge storage devices, such as batteries, which can provide a more instantaneous power supply for given application needs. In most instances, the direct current (DC) power which a fuel cell power system produces, must be converted to alternating current (AC) for most applications. In this regard, an inverter is normally used to convert the fuel cells DC power to AC. As a general matter, inverters generally function at a specified DC voltage. In some previous applications, the fuel cell and charge storage device have been coupled to an inverter which functions at the optimal voltage of either the fuel cell or the charge storage devices. In this arrangement, the voltage of the fuel cell was raised or lowered as appropriate, to provide optimum functioning of the system. Still further, experience has shown that altering the voltage resulted in decreased efficiency through heat loss incumbent in the conversion process.

Different customers or users of a fuel cell power plant may require a wide variety of power at different voltages or at different power levels. This could be handled with conventional DC-DC converters, transformers or other power conditioning circuitry; however, these solutions produce losses and inefficiencies inherent in the design of same.

The present invention addresses many of the shortcomings attendant with the prior art practices. For example, some previous designs which provide both a fuel cell and a charge storage device in the arrangement discussed above, have been unduly complex and have experienced decreased efficiency by way of heat losses caused by the raising or lowering the voltages generated by the fuel cell to make the fuel cell voltage match, as closely as possible, the battery voltage capacity of the charge storage device.

Attention is directed to commonly owned U.S. patent application Ser. No. 09/577,407, which was filed on May 17, 2000 and which is incorporated herein by reference. This application discloses details of one type of ion exchange membrane fuel cell power system having fuel cell subsystems and a controller that could be used in the preferred embodiment of the invention described below.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Figure 1:
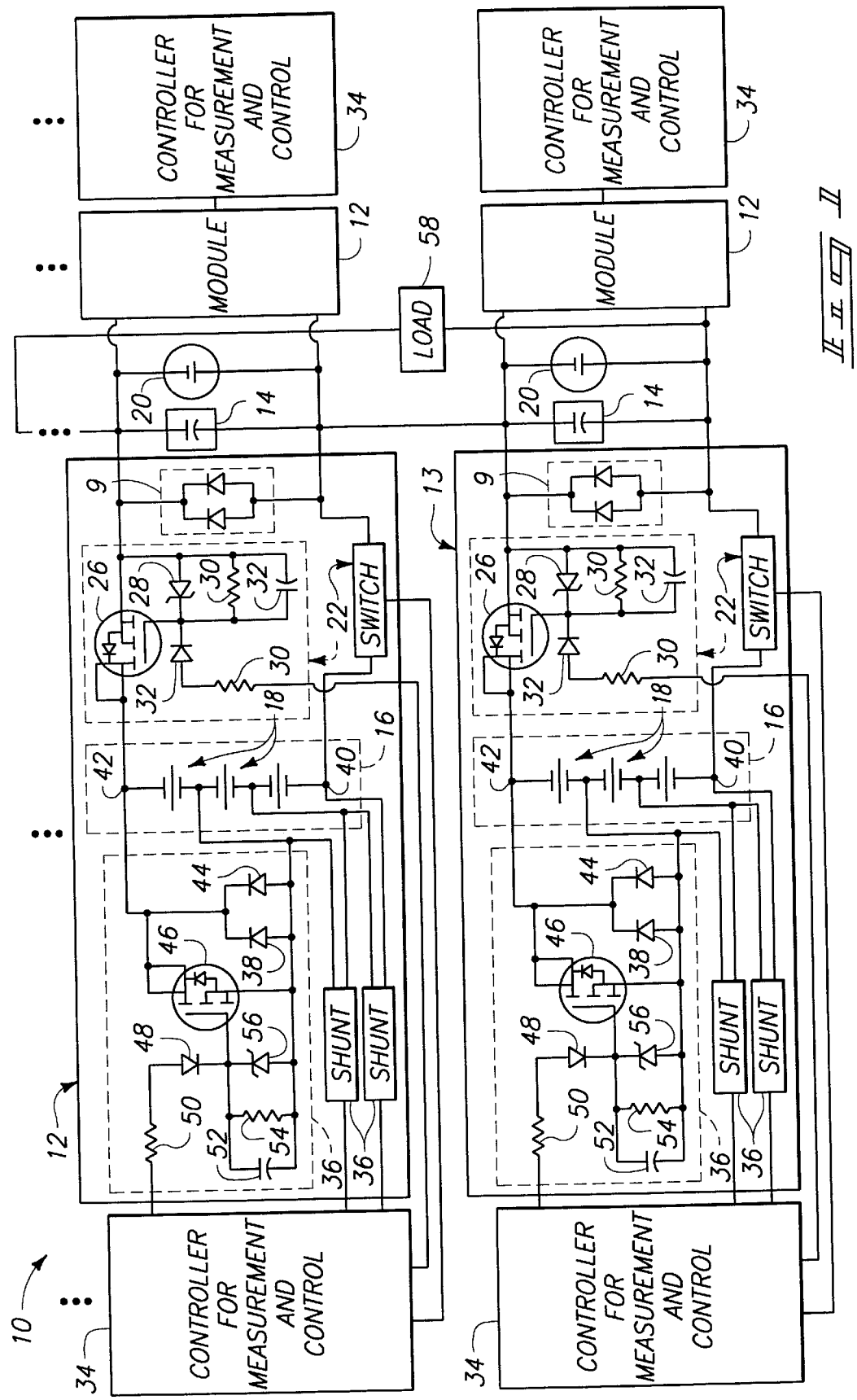
FIG. 1 is a schematic diagram illustrating a fuel cell power system in accordance with the present invention.

This disclosure of the invention is submitted in furtherance of the constitutional purposes of the U.S. Patent Laws "to promote the progress of science and useful arts" (Article 1, Section 8).

The present invention relates to a fuel cell power system, comprising a fuel cell which generates DC voltage; a plurality of energy storage devices selectively electrically coupled with the fuel cell; and circuitry for sequentially selectively electrically coupling and decoupling the respective energy storage devices to a load in a manner which approximates a voltage sine wave.

Another aspect of the present invention relates to a fuel cell power system, comprising means for electrochemically converting hydrogen to DC voltage; a plurality of means defining capacitances selectively electrically coupled with the means for electrochemically converting hydrogen; electrochemical energy storage means coupled in parallel to each capacitance defining means and means for sequentially selectively electrically coupling and decoupling the respective energy storage devices to a load in a manner which approximates a voltage sine wave.

Another aspect of the present invention relates to a fuel cell power system, comprising a plurality of fuel cells which respectively generate DC voltage while operating; a plurality of ultracapacitors, each ultracapacitor having a voltage condition; circuitry which, when operating, electrically couples a fuel cell to an ultracapacitor in response to the voltage of that ultracapacitor being less than a first predetermined voltage, and electrically de-couples the fuel cell from the ultracapacitor in response to the voltage of that ultracapacitor being greater than a second predetermined voltage; and circuitry which, when operating, selectively electrically couples and de-couples ultracapacitors to and from a load at different times, the times and number of ultracapacitors electrically coupled to the load at any of those times being selected by the circuitry so as to approximate a voltage sine wave, whereby the fuel cell power system performs AC inversion.

Another aspect of the present invention relates to a fuel cell power system comprising a plurality of fuel cells, each fuel cell being defined by a plurality of fuel cell subsystems electrically coupled together in series, each fuel cell subsystem, in operation, producing direct current electrical energy; a plurality of ultracapacitors, the ultracapacitors being associated with respective fuel cells, and each ultracapacitor having a voltage condition; a switch electrically coupled to each fuel cell to selectively electrically couple the fuel cell to its associated ultracapacitor; and control circuitry to cause the switches, for each fuel cell, to electrically couple the fuel cell to the associated ultracapacitor in response to the voltage of that ultracapacitor being less than a first predetermined voltage, and to electrically de-couple the fuel cell from the associated ultracapacitor in response to the voltage of that ultracapacitor being greater than a second predetermined voltage, the control circuitry further causing the switches couple and de-couple ultracapacitors to and from a load at different times, the times and number of ultracapacitors electrically coupled to the load at any of those times being selected by the control circuitry so as to approximate a voltage sine wave.

Yet another aspect of the invention relates to a method of operating a fuel cell power system, comprising providing a plurality of fuel cells which, in operation, respectively produce direct current electrical energy; providing a plurality of ultracapacitors, each ultracapacitor having a voltage condition; electrically coupling a fuel cell to an ultracapacitor when the voltage of that ultracapacitor is less than a first predetermined voltage, and electrically de-coupling the fuel cell from the ultracapacitor when the voltage of that ultracapacitor is greater than a second predetermined voltage; and selectively coupling and de-coupling the individual ultracapacitors to and from a load at different times, the times and number of ultracapacitors electrically coupled to the load at any of those times being selected so as to approximate a voltage sine wave.

Yet another aspect of the invention relates to A method of distributing electrical AC power, which is generated by a fuel cell power system, to a load, comprising defining a plurality of fuel cells by electrically coupling a plurality of fuel cell subsystems together in series to define each fuel cell; providing a plurality of ultracapacitors, the ultracapacitors being associated with respective fuel cells, and each ultracapacitor having a voltage condition; providing a switch associated with each fuel cell, and which selectively electrically couples the fuel cell to its associated ultracapacitor; and selectively controlling the switches to electrically couple a fuel cell to the associated ultracapacitor when the voltage of that ultracapacitor is less than a first predetermined voltage, and to electrically de-couple the fuel cell from the associated ultracapacitor when the voltage of that ultracapacitor is greater than a second predetermined voltage, and further causing the switches to couple and de-couple the respective ultracapacitors to and from a load at different times, the times and number of ultracapacitors electrically coupled to the load at any of those times being selected by the control circuitry so as to approximate a voltage sine wave.

Yet still further another aspect of the present invention provides a power system, including a plurality of fuel cells, which does not utilize a traditional, separate, power conditioner.

These and other aspects of the present invention will be discussed hereinafter.

FIG. 1 is a circuit schematic of a fuel cell power system or plant 10 in accordance with one aspect of the invention. The fuel cell power system 10 includes plurality of modules 12, 13, and additional modules (not shown in FIG. 1). For simplicity, only one module 12 will be described, as the other modules are, in one embodiment, of similar construction, with like reference numerals indicating like components. Some variations between the modules are possible as will be readily apparent to those of ordinary skill in the art.

The fuel cell power system 10 of the present invention includes an ultracapacitor 14 which is associated with the module 12. Ultracapacitors are relatively new. While a large conventional capacitor the size of a soda can may have a capacitance of milliFarads, an ultracapacitor of the same size may be rated at several thousand Farads. In the illustrated embodiment, the ultracapacitor 14 is a PowerCache model PC 2500, which is commercially available from Maxwell Technologies, Inc., Electronic Components Group, 9244 Balboa Avenue, San Diego, Calif. 92123. Other models could, of course, be employed.

According to Maxwell, an ultracapacitor or super capacitor, stores energy electrostatically by polarizing an electrolytic solution. An ultracapacitor is also known as a double-layer capacitor. It does not employ chemical reactions to store energy. An ultracapacitor includes two non-reactive porous plates suspended within an electrolyte and is adapted to have a voltage applied across the plates. One of the plates is a positive plate, and the other is a negative plate. The voltage on the positive plate attracts the negative ions in the electrolyte, and the on the negative plate attracts the positive ions, which creates two layers of capacitive storage, one where the charges are separated at the positive plate, and another at the negative plate.

Ultracapacitors behave like high-power, low-capacity batteries except that they store electric energy by accumulating and separating unlike-charges physically, as opposed to batteries which store energy chemically in reversible chemical reactions. Ultracapacitors can provide high power and can accept high power during charging. Ultracapacitors have high cycle life and high cycle efficiency as compared to commercially available chemical batteries. The voltage of an ultracapacitor is directly proportional to its state-of-charge. Therefore, for best operation, the manufacturer recommends that their operating range should be limited to high state-of-charge regions, or control electronics should be provided to compensate for widely varying voltage. As used herein and in the appended claims, the term "ultracapacitor" shall be defined as encompassing electrostatic multiple-layer capacitors (singly or in parallel and/or series combinations), as well as capacitors (single capacitors or parallel and/or series combinations of capacitors) with capacitances above one Farad.

The ultracapacitor 14, as discussed above, has a maximum voltage rating and an operating voltage range. For example, in the illustrated embodiment, the ultracapacitor 14 has a maximum rated voltage of 2.7 Volts DC, has a capacitance of 2500 Farads.

The module 12 further includes at least one fuel cell 16 which, in operation, converts chemical energy into direct current electrical energy. The fuel cell 16 is electrically coupled across the associated ultracapacitor 14. The fuel cell 16 of the module 12 is defined by a number of fuel cell subsystems or MEDA (Membrane Electrode Diffusion Assembly) subgroups 18 which are electrically coupled together in series. Each fuel cell subgroup 18 includes at least one ion exchange membrane (proton exchange membrane).

For each fuel cell subgroup 18, hydrogen gas is introduced at a first electrode (anode) where it reacts electrochemically in the presence of a catalyst to produce electrons and protons. The electrons travel from the first electrode to a second electrode (cathode) through an electrical circuit connected between the electrodes. Further, the protons pass through a membrane of solid, polymerized electrolyte (a proton exchange membrane or PEM) to the second electrode. Simultaneously, an oxidant, such as oxygen gas, (or air), is introduced to the second electrode where the oxidant reacts electrochemically in the presence of the catalyst and is combined with the electrons from the electrical circuit and the protons (having come across the proton exchange membrane) thus forming water and completing the electrical circuit. See, for example, the following U.S. patents, which are incorporated by reference herein: U.S. Pat. Nos. 5,242,764; 5,318,863; 6,030,718; 6,096,449.

Each fuel cell subgroup 18 produces a voltage which is not necessarily equal to the output voltage of the adjoining fuel cell subsystems. In one embodiment, each of the fuel cell subgroups 18 produce a voltage of about 0.5–0.8 Volts.

The fuel cell power system 10 further comprises a fuel supply (not shown) which is disposed in fluid communication with the anode side of each of the fuel cell subgroups 18, and an oxidant supply (not shown), in fluid communications with the cathode side of each of the fuel cell subgroups 18. In one embodiment, the fuel is hydrogen, and the oxidant is oxygen (or ambient air). Other fuel or oxidant types can be employed with the present invention with equal success.

The number of fuel cell subgroups 18 which are coupled in series is selected such that the combined voltage of the fuel cell subgroups 18 is no greater than the maximum voltage rating of the ultracapacitor 14. In one embodiment of the present invention, the fuel cell subgroups 18 produce about the same voltage each.

The direct current electricity generated by a fuel cell must be regulated and boosted, depending on how many fuel cell membranes are placed in series. Most fuel cell designs incorporate DC to DC converter circuits with voltage regulation to generate a fixed DC output of the level required by the load. Conventional DC to DC converters usually result in an efficiency loss of ten to fifteen percent.

In one embodiment, one or all of the ultracapacitors 14 are replaced with conventional capacitors having high capacitances (e.g., over one Farad).

The fuel cell power system 10 further optionally includes a battery 20 electrically coupled in parallel with each ultracapacitor 14 if long term storage capability is desired for a particular application. In one embodiment, the battery 20 which is associated with the module 12 is a single cell battery. Certain batteries sold in the marine industry, for example, are single cell batteries and can be employed in the illustrated embodiment, while automotive batteries constitute multiple cell batteries. Each battery 20 has a maximum voltage. When both batteries and ultracapacitors are included, the batteries 20 handle lengthy demand peaks and provide long term storage capability while the ultracapacitors 14 handle rapid transients.

The number of fuel cell subgroups 18 coupled in series across an ultracapacitor 14 is selected, for each module 12, 13, such that the combined voltage of those fuel cell subgroups 18 is below or no greater than the maximum voltage of the associated battery 20. Additionally, the fuel cell subgroups 18 coupled together in series produce a voltage within the operating voltage range of the ultracapacitor, for each module. Thus, in the illustrated embodiment, for module 12, the fuel cell 16 is defined by three fuel cell subgroups 18 coupled together in series, each of which produces a voltage of about 0.6 Volts. These fuel cell subgroups 18 in series produce a voltage of about 1.8 Volts DC which is in the operating range of the ultracapacitor 14 associated with module 12. 1.8 Volts DC is also below or less than the maximum voltage of the ultracapacitor 14 associated with module 12, and below or less than the maximum voltage of the battery 20 associated with module 12. Other values could be used for the battery, ultracapacitor, and fuel cell subsystems; however, in the preferred embodiment, the voltage of the subsystems coupled together in series is within the operating range of the ultracapacitor; less than the maximum voltage of the ultracapacitor; and less than the maximum voltage of the battery which is coupled in parallel with the ultracapacitor of a module. Additionally, the ratio of fuel cell subsystems to batteries and ultracapacitors is selected appropriately. For example, in one embodiment, if the fuel cell 16 produces 2.2 Volts, that is considered at the high or extreme end of the voltage storage capacity of the battery, while the ultracapacitor 14 has a maximum voltage of 2.7 Volts.

The high capacitance level of the ultracapacitor 14 provides an opportunity to design a power electronic circuit (described below) that can utilize this highly responsive energy storage device to provide regulated and equalized DC outputs from multiple DC sources, such as batteries 20 or fuel cells 16, more efficiently than with conventional circuit designs.

The fuel cell power system 10 further includes circuitry configured to selectively electrically couple the fuel cell 16 of module 12 to the ultracapacitor 14, which is associated with the module 12, in response to the voltage of the ultracapacitor 14 being less than or below a first predetermined voltage (e.g., 1.8 VDC). Yet further the same circuitry electrically de-couples the fuel cell 16 of module 12 from the ultracapacitor 14 in response to the voltage of the ultracapacitor being above a second predetermined voltage (e.g., 2.2 VDC). In the illustrated embodiment, this circuitry includes circuitry 22 included in respective modules 12, 13.

The circuitry 22 includes a switch 26 which is electrically coupled with the plurality 16 of fuel cell subgroups 18 and which further is configured to selectively electrically couple the plurality 16 to the ultracapacitor 14 associated with the module 12. In one embodiment, the switch 26 comprises a MOSFET or, more particularly, a plurality of MOSFETs, which are electrically coupled together in parallel in order to reduce impedance. The module 12, as a whole, is designed with impedance in mind. In this regard impedance is minimized where possible, in one embodiment. The circuitry 22 further includes, in the illustrated embodiment, Zener diode 28, resistor 30, and capacitor 32 electrically coupled together in parallel; and further electrically coupled between a gate of the MOSFET 26 and the ultracapacitor side of the MOSFET 26. The diode 28 has an anode on the ultracapacitor side of the MOSFET 26, and a cathode coupled to the gate of the MOSFET 26. The circuitry 22 further includes a resistor 30 and a diode 32 coupled together in series.

The fuel cell power system 10 further includes control circuitry 34 for measurement and control, for each module 12 or for multiple modules 12. For each module 12, the control circuitry 34 is configured to sense various voltages (e.g., voltage across fuel cell 16 and each fuel cell subsystem 18, voltage across ultracapacitor of the module). For each module 12, the control circuitry 34 is also configured to cause the switch 26 to selectively electrically couple the series coupled fuel cell subgroups 18, of module 12, to the ultracapacitor 14 which is associated with module 12, in response to the voltage of the ultracapacitor 14 being less than or below the first predetermined voltage (e.g., 1.8 VDC). Yet further, the control circuitry de-couples the series coupled fuel cell subgroups 18, of module 12, from the ultracapacitor 14 associated with module 12 in response to the voltage of the ultracapacitor 14 being greater than or above the second predetermined voltage (e.g., 2.2 VDC). In one aspect of the present invention, the control circuitry comprises a controller or processor 34 which is electrically coupled to each of the modules 12, 13. The controller 34 measures the individual voltages of the modules 12, 13 and electrically switches in the respective fuel cells 16 to the respective ultracapacitors 14, when appropriate, for each module. The above-described switching, by the controller 34, for each module occurs independently of the switching which may occur at the other modules. In this regard, the controller is preferably a digital controller, and may comprise a programmable controller, computer, processor, or embedded microprocessor.

As seen in the drawings (FIG. 1), the series coupled resistor 30 and diode 32 are coupled between the controller 34 and the gate of the MOSFET 26. Yet further the diode 32 has a cathode coupled to the gate of the MOSFET 26 and therefore also to the cathode of the diode 28.

The system 10 further includes, for each module, 12 and 13, one or more fuel cell shunt and passive diode protection circuits 36 coupled to the controller 34. In one embodiment, a circuit 36 is provided for each fuel cell subgroup 18. In alternative embodiments, multiple subgroups 18 are associated with each circuit 36. In one embodiment, the controller 34 causes each circuit 36 to periodically shunt electrical current between the anode and cathode of the respective fuel cell subgroups 18. The specific circuitry 36 shown in FIG. 1 includes a diode 38 having an anode coupled to negative terminal 40 of fuel cell 16 and having a cathode coupled to positive terminal 42 of fuel cell 16. In the illustrated embodiment, a second diode 44 is coupled in parallel with the first diode 38. The circuitry 36 further includes a switch 46, e.g., a MOSFET (or multiple parallel MOSFETs) having a drain coupled to the positive terminal 42 of fuel cell subgroup 18 and further having a source coupled to the negative terminal 40 of the fuel cell subgroup 18, and also having a gate coupled to the controller 34 via a diode 48 and resistor 50. The circuitry 36 also includes a capacitor 52, resistor 54, and Zener diode 56 coupled together in parallel between the gate of the MOSFET 46, and the anode of the diode 38. The circuitry 36 and controller 34 are designed and operate, in one embodiment, in a manner substantially similar to that described or claimed in U.S. Pat. No. 6,096,449 to Fuglevand et al., which is incorporated by reference herein. The shunting functionality is omitted in one alternative embodiment of the invention.

In one embodiment, the module 12 further includes diodes 9 to protect against potential inversions of the ultracapacitor 14.

Figure 2:
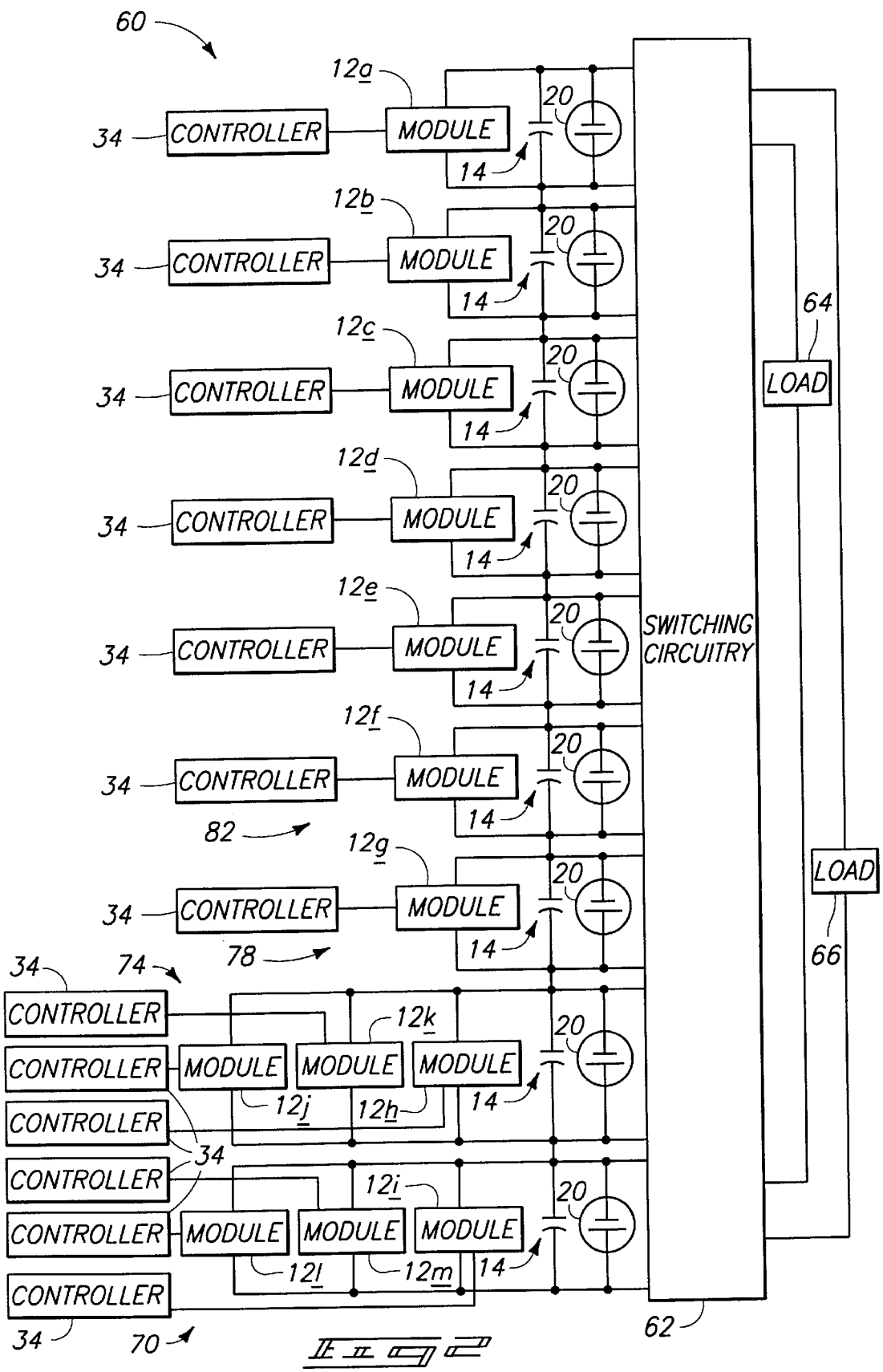
FIG. 2 is a schematic diagram illustrating a fuel cell power system in accordance with another aspect of the present invention.

FIG. 2 shows a fuel cell power system 60, similar to the previously disclosed system 10, with multiple modules 12a–i electrically coupled together in series. Although a certain number of modules are shown in series, different numbers are possible depending on the output voltage desired. Each of the modules 12a–i is substantially similar to the module 12 shown in FIG. 1.

Conventional fuel cell design, particularly for modular fuel cells with fewer membranes per module, require the use of a DC to DC converter to raise the voltage output of the membranes to a voltage usable by the load or an inverter. This converter, which results in an efficiency loss, can be eliminated by placing the multiple modules 12a–12i in series. If each module, for example, has a nominal voltage of 2.0 Volts, by placing them in series, overall output voltages of 24V, 48V, or 120V, for example, can be generated without need for a conventional DC to DC converter.

The system 60 further includes switching circuitry 62 for switching a number of modules to produce a desired voltage at one or more loads 64 and 66. Though two loads are shown, multiple different loads can be serviced with equal success.

A user of the system 60 may require multiple DC voltage levels, e.g., 6 VDC for charging batteries, 24 VDC for some electronics circuits, and 48 VDC for some other load such as an input to an inverter, or other voltages for any other type of load. With the design shown in FIG. 2 and described herein, using multiple modules 12a–i in series, taps can be inserted between modules to draw power from the series of modules to meet the load required. Because each module has its own associated energy storage device (ultracapacitor 20) and a DC generator (fuel cell 16), the controller 34 can ensure that the voltage is maintained in each module 12a–i even though the load on each module will vary.

As the load on the fuel cell subgroups 18 changes, the output voltage will change according to each membrane's current-voltage (I–V) curve. The circuit design shown in FIGS. 1 and 2 allows real-time compensation of voltage by switching in and out various modules 12a–i, using the controller 34 and switching circuitry 62. Using the multiple taps and multiple modules 12a–i, the voltage can be regulated to within the voltage of a single module (e.g., 2 Volts). Furthermore, if one or more modules fail or if the output voltage declines, the controller 34 will, in one embodiment, automatically maintain the voltage by switching in other modules. This is not possible with regular batteries and capacitors because batteries are too slow to charge and conventional capacitors are too small in capacitance to deliver the current required.

In traditional circuitry, when multiple DC sources are placed in series, the voltage across each DC source must be equalized to prevent unbalanced loading on any one source. This equalization is normally done by placing bleed resistors across the circuit or other lossy schemes to hold voltage. The circuitry shown in FIGS. 1 and 2 eliminates the need for such schemes and provides equalization by controlled switching of the ultracapacitors in each circuit. Because multiple modules are switched to meet the load, the voltage across each DC source can be driven to a fixed voltage even if the load changes.

In one alternative embodiment (see FIG. 2), the fuel cell power system 60 further includes, for one or more modules (e.g., modules 12h and 12i), a second plurality of fuel cell subsystems coupled together in series. The second plurality is provided in parallel with the first plurality 16 of fuel cell subsystems. More particularly, the fuel cell power system 60 includes modules 12j and 12k in parallel with module 12h, and modules 12l and 12m in parallel with module 12i. Modules 12a–m are substantially identical to module 12 shown in FIG. 1, in one embodiment, and each include a fuel cell 16 (made up of series coupled fuel cell subgroups 18).

For example, if a load 64 requiring a certain voltage (e.g. 3.6 VDC) is going to be greater than loads at other voltages (e.g., greater current demand), multiple parallel modules can be provided (e.g., modules 12j and 12k are provided parallel to module 12h and modules 12l and 12m are provided parallel to module 12i) appropriate for that load. The number of parallel modules (e.g., 12j and 12k) can be varied depending on the load demands. In another example, up to five additional modules (e.g., up to six total modules) of series coupled fuel cell subsystems are coupled to one ultracapacitor (e.g., the ultracapacitor associated with module 12h). The inventor has determined that the ultracapacitor can handle such a number. Other numbers may be possible, e.g., depending on the model of ultracapacitor used and the construction of the fuel cell subsystems.

Figure 3:
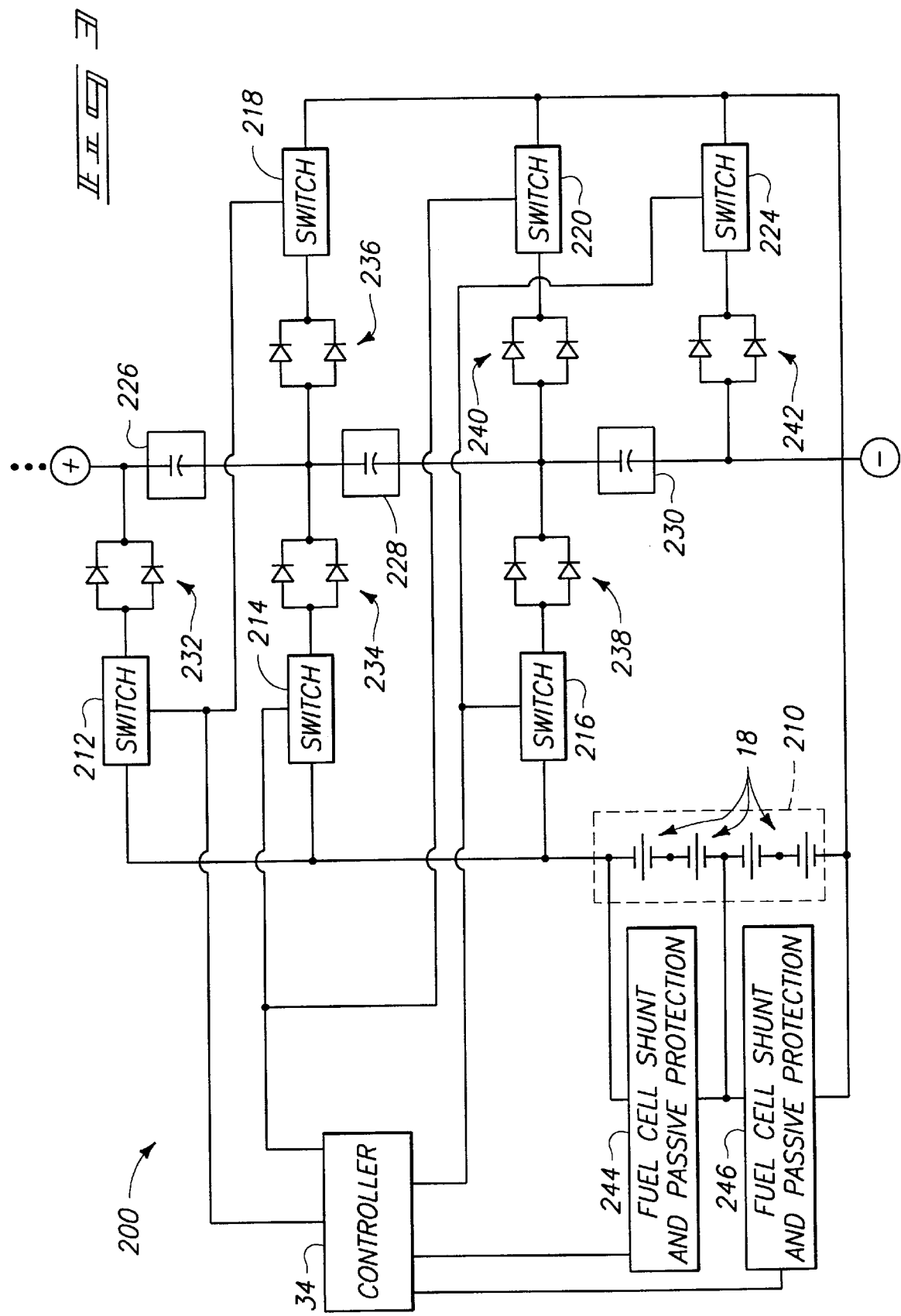
FIG. 3 is a schematic diagram illustrating a fuel cell power system in accordance with an alternative embodiment of the present invention.

In an alternative embodiment shown in FIG. 3, a fuel cell system 200 includes a single set 210 of fuel cell subgroups 18 and multiple switched ultracapacitors (or parallel groups of ultracapacitors) 226, 228, and 230 which are placed in series to develop a desired voltage, rather than the system being arranged with multiple groups of parallel fuel cells and ultracapacitors. The system 200 includes switches 212, 214, 216, 218, 220, and 224 that are coupled to the controller 34 and that are used to selectively couple or decouple a selected ultracapacitor 226, 228, or 230 from the set 210 of fuel cell subgroups. Other ratios of fuel cell subsystems to ultracapacitors can be employed.

The switch 212 controls a supply line to the ultracapacitor 226 and the switch 218 controls a return line from the ultracapacitor 226. The switch 214 controls a supply line to the ultracapacitor 228 and the switch 220 controls a return line from the ultracapacitor 228. The switch 216 controls a supply line to the ultracapacitor 230 and the switch 224 controls a return line from the ultracapacitor 230. In one embodiment, the switches 212, 214, 216, 218, 220, and 224 are respectively substantially similar to the configuration 22 shown in FIG. 1; however, various alternative constructions could be employed for the switches 212, 214, 216, 218, 220, and 224 or the switches 22. Further, not all switches in the system are necessarily identical or similar. The system 200 may further include circuitry to control current direction such as diodes or diode pairs 232, 234, 236, 238, 240, and 242. Alternatively, this functionality can be included in the switches 212, 214, 216, 218, 220, and 224. The circuit 200 further includes circuitry 244 and 246, coupled to the controller 34, defining fuel cell shunt and passive diode protection. The circuitry 244 and 246 could be similar in detailed design to the circuitry 36 shown in FIG. 1. Instead of only two circuits 244 and 246 being employed, a separate fuel cell shunt and passive diode protection circuit could be provided for each fuel cell subgroup 18. The circuitry 244 or 246 are designed and operate, in one embodiment, in a manner substantially similar to that described or claimed in U.S. Pat. No. 6,096,449 to Fuglevand et al., which is incorporated by reference herein. The shunting functionality is omitted in one alternative embodiment of the invention.

In the configuration shown in FIG. 3, the ultracapacitors 14 serve as a DC boost converter to raise the output DC voltage of the fuel cell set 210 to a higher DC voltage. The fuel cell set 210 charges, in operation, ultracapacitor 226 (or a group of parallel ultracapacitors located where ultracapacitor 226 is shown) for a period of time (e.g., on the order of one second or a few hundred milliseconds or some other period, depending, for example, on switching frequency), then controller 34 switches the fuel cell set 210 to be in parallel with ultracapacitor 228 (or a group of parallel ultracapacitors located where ultracapacitor 228 is shown) to charge that group, and so on, so that each ultracapacitor or group of ultracapacitors 226, 228, and 230 is periodically and regularly charged by the fuel cell set 210. The ultracapacitors (or groups) 226, 228, and 230 are configured in series such that the output delivers current to a load at a voltage determined by the number of ultracapacitors (or groups) 226, 228, and 230 placed in series and their conditions. In one embodiment, two four-membrane fuel cell cartridges are configured to charge six groups of ultracapacitors. For example, two four-membrane fuel cells with a nominal voltage output of about 2.0V are configured to charge six groups of ultracapacitors to provide a 12VDC output that could be used for battery charging and other 12V applications. The controller 34 also senses voltages across various nodes.

Operation

The operation of the described embodiments of the present invention are believed to be readily apparent and are summarized below.

The inventor has recognized that ultracapacitors can be advantageously used in fuel cells systems, with appropriate switching circuitry, to absorb rapid changes in load conditions, and further to absorb rapid electrical charging without damage. This allows, for example, a load to be electrically coupled to a tap between series coupled modules 12a–i without a concern about electric imbalances.

In one alternative embodiment of the invention (see FIG. 4), the modules 12a–i are not coupled in series outside the switching circuitry 62, but are instead each directly coupled to the switching circuitry 62. In this embodiment of the invention, the switching circuitry 62 couples a desired number of modules together in series (and/or in parallel) depending on the load requirements.

In another embodiment, at sequential time intervals (e.g., every millisecond), the controller 34 electrically connects a number of the modules 12a–i to a load 64 or 66 to meet the power requirements of the load 64 or 66 at the time. The switching circuitry 62 is therefore capable of high speed switching, and includes switching rated to handle the output of the fuel cells 16.

Figure 5:
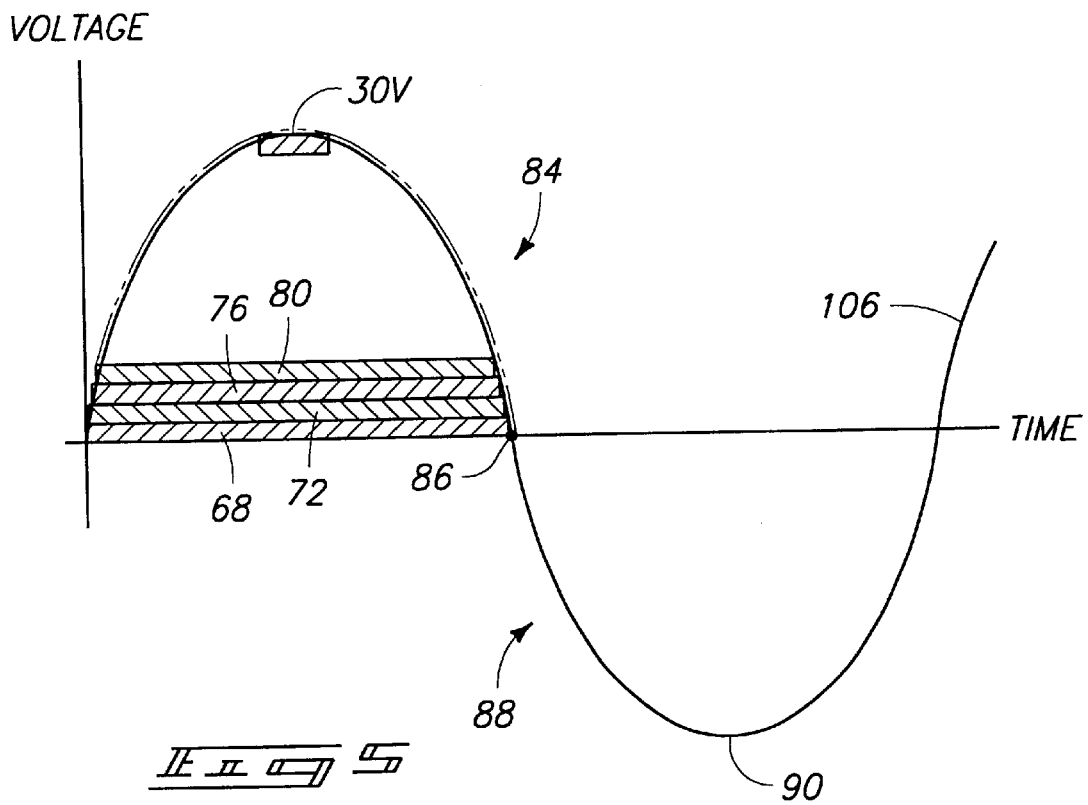
FIG. 5 is a plot of voltage verus time, illustrating how the system of FIG. 2 can be used to generate a sine wave to provide the functionality of an inverter.

If desired, and as illustrated in FIG. 5, the digital controller 34 may create a sinusoid by controlling the switching circuitry 62 to connect and disconnect a number of modules 12a–i (or a number of rows or parallel sets of modules should parallel modules such as 12j, 12k, 12l and 12m exist for certain rows) at sequential time intervals. An AC waveform is generated by controlled switching of DC modules. A circuit generates an AC waveform directly by rapidly switching multiple fuel cell/ultracapacitor rows or circuits 70, 74, 78, 82 such that no separate DC to AC inverter is required. Potential advantages include substantial reduction in losses inherent in conventional invertors and ability to provide both real and reactive power support to AC loads from the ultracapacitors.

Thus, as shown in FIG. 5, a portion 68 of the sinusoid is created by turning on row 70 of the system 60 of FIG. 2 for a predetermined amount of time. Still further a portion 72 of the sinusoid is created by later turning on row 74 while keeping row 70 on. Yet further a portion 76 of the sinusoid is created by later turning on row 78 while keeping rows 70 and 74 on. Moreover a portion 80 of the sinusoid is created by later turning on row 82 while keeping rows 70, 74, and 78 on, etc. The peak voltage of the sinusoid will depend on the number of rows of modules 12a–i that are employed. To create the downward slope 84 of the positive portion of the sine wave, these same rows are disconnected at staggered times. For example, row 82 is turned off before turning off row 78; row 78 is turned off before turning off row 74; row 74 is turned off before turning off row 70, then row 70 is turned off to create zero point 86.

Then, to create the negative portion 88 of the sine wave, rows 70, 74, 78, and 82 are turned on in staggered intervals as described above (then turned off in staggered intervals after minimum point 90 is reached) except that polarities are reversed.

Figure 6:
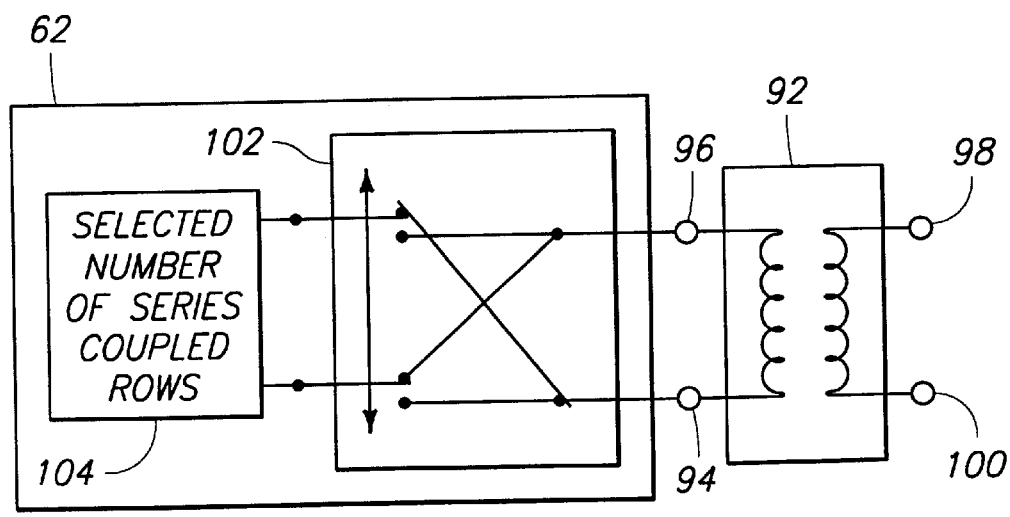
FIG. 6 illustrates circuitry that can be included in the system of FIG. 2 to define the lower portion of the sine wave of FIG. 5.

For example, in FIG. 6, load 64 comprises a transformer 92 having input terminals 94 and 96, and output terminals 98 and 100 which are electrically coupled to a power grid or AC load. The transformer 92 is used to match a desired AC voltage level (e.g., 120VAC). The load 64 may also include a filter to smooth the waveform. The switching circuitry 62 (or controller 34, if the switching circuitry is incorporated into the controller 34) includes a switch 102 for reversing the polarity of the output of the selected number 104 of rows 70, 74, 78, 82, etc. The output of the series coupled rows 104 is provided to the inputs 94 and 96 via the switch 102. When the zero point 86 is reached, the polarity is reversed by activating or tripping the switch 102 which is electrically coupled to the inputs 94, 96 of the transformer 92. Rows 70, 74, 78, and 82 are then sequentially turned on as described above at times appropriate for creating a sine wave. When the next zero point 106 is reached, the switch 102 is again activated to reverse the polarity. The smoothness of the curve is determined by the number of rows of modules 12a–i employed. If having a great number of modules to smooth out the curve generates too high of a voltage, the voltage can be stepped down by transformer 92. Alternatively, if a greater voltage is desired, a step-up transformer can be employed for the transformer 92.

Figure 4:
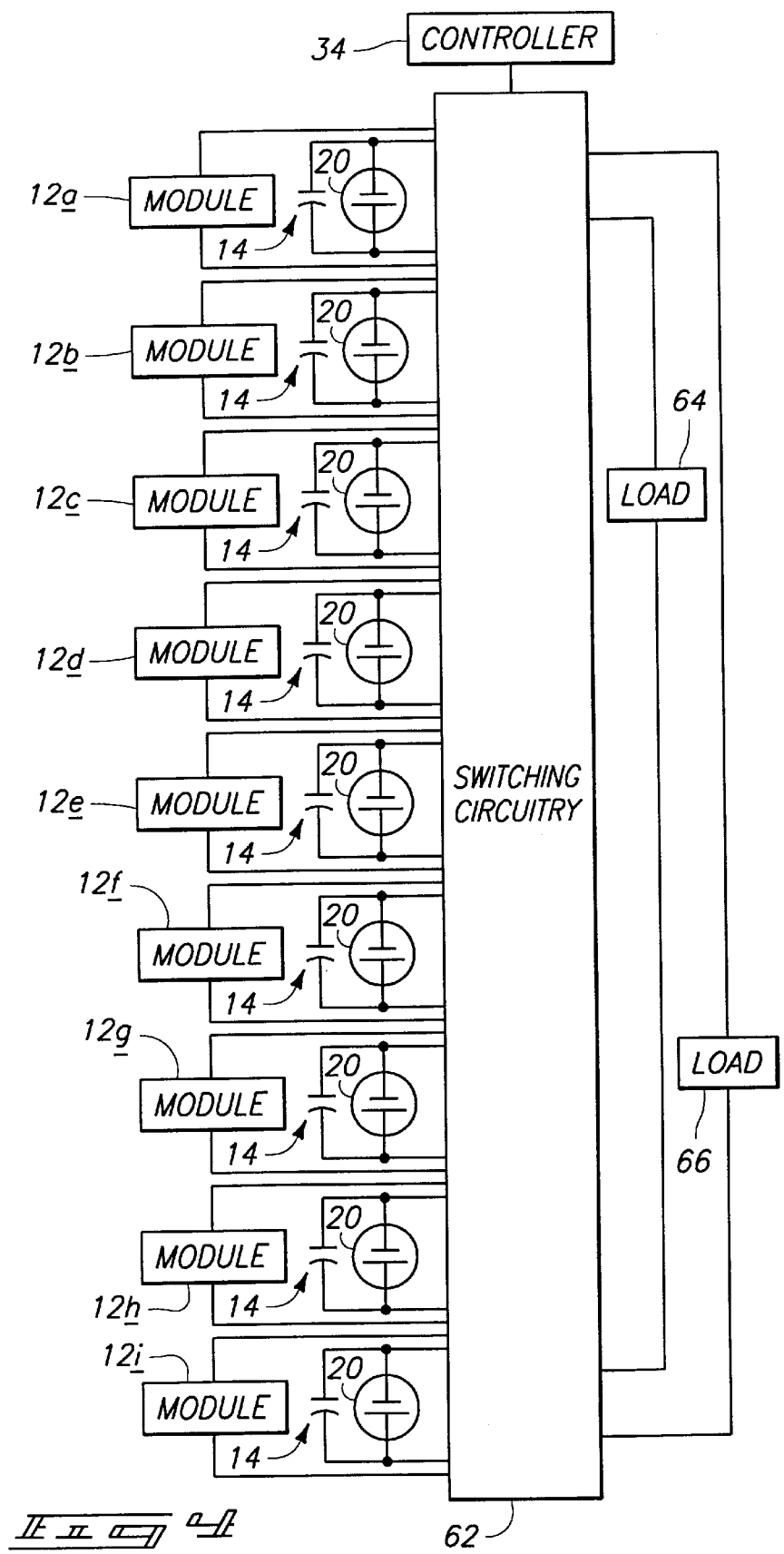
FIG. 4 is a schematic diagram illustrating a fuel cell power system in accordance with another alternative embodiment of the present invention.

In one embodiment, to efficiently use the modules 12a–m (see FIG. 2), the modules 12a–m are distributed so that more modules are used to generate the base of the sinusoidal waveform than are used to generate the peak (e.g., more modules are included in lower rows than in upper rows). This is because the fuel cells powering the base of the waveform must be switched on for longer periods of time and must provide more capacity. Alternatively, the controller 34 can be used to distribute the burden of the various parts of the waveform among various rows or modules to optimally distribute the load. Thus, in the embodiment shown in FIG. 4, for example, the modules 12a–12m are directly independently coupled to the switching circuitry 62, as are the ultracapacitors 14 and batteries 20. In the embodiment of FIG. 4, the controller 34, using the switching circuitry 62, couples and decouples selected modules (or multiple modules) to and from selected ultracapacitors and batteries to create the desired waveform with a proper, efficient, distribution of the load.

The switching circuitry 62 and digital controller 34 can also create any other desired waveform, such as a square waveform, for example. In one alternative embodiment, the functionality of the switching circuitry 62 is incorporated into the controller 34. Note that since taps can be taken intermediate modules 12*i* and 12*a* in the embodiment of FIG. 2, the rows that are selected to be turned on or off to create the sinusoid or output waveform do not necessarily have to be from bottom row 70 up.

In an alternative embodiment, the controller 34 includes a memory, and the power system 10 further comprises sensors (not shown) which are individually electrically coupled with each of the fuel cells 16 or subgroups 18 to sense the voltage and current output of each. The sensors are coupled in signal transmitting relation relative to the controller, and the controller periodically archives the information for each fuel cell or fuel cell subsystem in memory to provide a performance history for each. Further, the performance history, when compared against archival information which relates to other similar fuel cells will provide an early indicator or predictor of when individual fuel cells are reaching the end of their useful life or need maintenance, or when operational conditions in the fuel cell are less than ideal.

For example, fuel cell performance can be affected by such factors as contamination of one or both of the reactant gas sources, excess heat in the fuel cells, and the more common problems such as a manufacturing defect in the fuel cell or fuel cell subsystem. The performance of each fuel cell subsystem is thus capable of being individually monitored. A performance problem with an individual fuel cell or fuel cell subsystem can be detected even if the overall performance of the collection of fuel cells is within normal operating parameters. Additionally, the selective switching of individual fuel cells or fuel cell subsystem (e.g., in the alternative embodiment of FIG. 4 where individual fuel cells 16 or fuel cell subgroups 18 and associated ultracapacitor 14 and battery 20 are directly coupled to the switching circuitry 62) provides a further advantage of maximizing fuel cell life expectancy and fuel cell performance by allowing the controller 34 to couple selected fuel cells 16 or fuel cell subgroups 18 based in part upon the voltage and current produced by the individual fuel cells, the voltage and current requirements of the load, and the performance history of each of the fuel cells.

Therefore, in the case of a particular predetermined output, which is defined by a given voltage, and current requirement of the load, and a specific waveform, the individual fuel cells may be selectively connected to the load for only brief intervals of time, or constantly connected depending upon the load and the factors outlined above.

In one embodiment, sinusoidal distribution of capacity is provided if it is desired to produce a sinusoid. For example, in one embodiment, the number of modules coupled in parallel to any particular ultracapacitor will vary such that more modules are provided to define the base of the sinusoid than near the peak of the sinusoid. Similar capacity distribution can be implemented for waveforms of other shapes.

In another embodiment, because the time when steps are taken is controlled, it may be desired to time the steps between the voltage waveform and the load's current waveform such that the current waveform lags or leads the voltage waveform. The ability to control the waveforms in this way, combined with the ability of the ultracapacitors to store large amounts of energy for brief periods, allows the system to provide reactive power, which cannot be done effectively with conventional DC sources with AC inverters. In one embodiment, the system 10 acts as a synchronous condensor or a system allowing power factors other than unity.

In still another embodiment, the fuel cell power system 10 further comprises error processor circuitry (not shown) which is coupled in voltage sampling relation relative to the output of the switching circuitry 62, or the output of individual fuel cells 16 or subgroups 18 to provide feedback to the controller 34. More particularly, the power system 10 comprises voltage and current sensors which sense actual output of the fuel cells 16 or subgroups 18 or output of the switching circuitry 62. The error processor circuitry compares the actual output of the voltage storage assembly to the desired output, and makes appropriate adjustments, if necessary. The error processor circuitry can be incorporated in the controller 34, in one embodiment, and implemented digitally or in an analog fashion.

Thus, a system has been provided wherein taps can be taken in the middle of a set of series coupled batteries without worrying about issues of equalization. DC to DC conversion is possible, as is AC inversion without the need for a complex inverter.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A fuel cell power system, comprising:
   a fuel cell which generates DC voltage;
   a plurality of energy storage devices selectively electrically coupled with the fuel cell; and
   circuitry for sequentially selectively electrically coupling and decoupling the respective energy storage devices to a load having an AC voltage demand in a manner which approximates an AC voltage sine wave to supply at least a portion of the AC voltage demand of the load.

2. A fuel cell power system as claimed in claim 1, wherein the fuel cell comprises multiple fuel cells.

3. A fuel cell power system as claimed in claim 2, wherein the energy storage devices are ultracapacitors which each have a variable DC voltage condition.

4. A fuel cell power system as claimed in claim 3, and further comprising:
   second circuitry which electrically couples and decouples the respective fuel cells to an ultracapacitor based on the voltage condition of the ultracapacitor.

5. A fuel cell power system as claimed in claim 1, wherein the fuel cell is defined by a plurality of fuel cell subsystems, each fuel cell subsystem comprising an ion exchange membrane.

6. A fuel cell power system as claimed in claim 5, wherein each fuel cell has an associated group including one or more energy storage devices, and wherein the second circuitry electrically couples the fuel cell to its associated group when the voltage of the group is less than a first predetermined DC voltage, and electrically decouples the fuel cell from its associated group when the voltage of the group is greater than a second predetermined DC voltage.

7. A fuel cell power system as claimed in claim 6 wherein the energy storage devices comprise ultracapacitors.

8. A fuel cell power system as claimed in claim 7, wherein each of the ultracapacitors have a maximum voltage rating, and wherein each fuel cell is defined by a number of fuel cell subsystems which are electrically coupled together in series, and wherein the combined DC voltage of the fuel cell subsystems is not greater than the maximum voltage rating of the associated group, in operation.

9. A fuel cell power system as claimed in claim 8, wherein at least one of the ultracapacitors has an operating voltage of about 1.8 to about 2.2 volts DC, and wherein the associated fuel cell subsystems electrically coupled to same produces a DC voltage of about 0.6 volts.

10. A fuel cell power system as claimed in claim 9, and further comprising:
   a battery electrically coupled in parallel with each ultracapacitor and which has a maximum voltage, and wherein the combined voltage of the fuel cell subsystems electrically coupled with same is not greater than maximum voltage of the battery which is electrically coupled in parallel with each ultracapacitor.

11. A fuel cell power system as claimed in claim 10, wherein the battery is a single cell battery.

12. A fuel cell power system, comprising:
   means for electrochemically converting hydrogen to DC voltage;
   a plurality of means defining capacitances selectively electrically coupled with the means for electrochemically converting hydrogen;
   electrochemical energy storage means coupled in parallel to each capacitance defining means and
   means for sequentially selectively electrically coupling and decoupling the respective energy storage devices to a load having an AC voltage demand in a manner which approximates an AC voltage sine wave to substantially meet the AC voltage demand of the load.

13. A fuel cell power system as claimed in claim 12, wherein the means for electrochemically converting hydrogen comprises a fuel cell of a type selected from the group consisting of: proton exchange membrane, solid oxide, phosphoric acid, alkaline, and molten carbonate.

14. A fuel cell power system as claimed in claim 13, wherein the respective means defining capacitances comprise ultracapacitors which each have a variable voltage condition.

15. A fuel cell power system as claimed in claim 14, and further comprising:
   second circuitry which electrically couples and decouples the respective means for electrochemically converting hydrogen to one ultracapacitor when the ultracapacitor has a predetermined voltage.

16. A fuel cell power system as claimed in claim 12, wherein each means for electrochemically converting hydrogen has associated capacitance defining means, the fuel cell power system further comprising second circuitry which electrically couples the means for electrochemically converting hydrogen to its associated capacitance means when the voltage of the capacitance means is less than a first predetermined DC voltage, and electrically decouples the fuel cell from its associated capacitance means when the voltage of the capacitance means is greater than a second predetermined DC voltage.

17. A fuel cell power system as claimed in claim 12, wherein each capacitance defining means has a maximum DC voltage rating, and wherein each means for electrochemically converting hydrogen is defined by a number of fuel cell subsystems which are electrically coupled together in series, and wherein the combined DC voltage of the fuel cell subsystems is not greater than the maximum DC voltage rating of the associated capacitance defining means, in operation.

18. A fuel cell power system as claimed in claim 12, wherein the capacitance means are respectively defined by one or more ultracapacitors and which are capable of operating in a voltage range of about 1.8 to about 2.2 volts DC, and wherein the associated means for electrochemically converting hydrogen electrically coupled to same produces a voltage of about 0.6 volts DC.

19. A fuel cell power system as claimed in claim 12, wherein the electrochemical energy storage means comprise respective batteries each having a maximum voltage, and wherein the voltage of the means for electrochemically converting hydrogen is not greater than maximum voltage of any battery to which the means for electrochemically converting hydrogen is selectively coupled.

20. A fuel cell power system as claimed in claim 19, wherein the batteries are single cell batteries.

21. A fuel cell power system, comprising:
   a plurality of fuel cells which respectively generate DC voltage while operating;
   a plurality of ultracapacitors, each ultracapacitor having a DC voltage condition;
   circuitry which, when operating, electrically couples a fuel cell to an ultracapacitor in response to the voltage of that ultracapacitor being less than a first predetermined DC voltage, and electrically de-couples the fuel cell from the ultracapacitor in response to the voltage of that ultracapacitor being greater than a second predetermined DC voltage; and
   circuitry which, when operating, selectively electrically couples and de-couples ultracapacitors to and from a load having an AC voltage demand at different times, the times and number of ultracapacitors electrically coupled to the load at any of those times being selected by the circuitry so as to approximate an AC voltage sine wave, whereby the fuel cell power system performs AC inversion to substantially meet the AC voltage demand of the load.

22. A fuel cell power system in accordance with claim 21 wherein the ultracapacitors each have a maximum DC voltage rating, and wherein each fuel cell is defined by a number of fuel cell subsystems which are electrically coupled together in series, and wherein the combined DC voltage of the numbered fuel cell subsystems for a fuel cell is no greater than the maximum DC voltage rating of the ultracapacitor to which it is coupled or decoupled.

23. A fuel cell power system in accordance with claim 22, and further comprising a single cell battery which is electrically coupled in parallel with each ultracapacitor and which has a maximum voltage, and wherein the combined DC voltage of the numbered fuel cell subsystems of each fuel cell is not greater than the maximum voltage of the battery which is electrically coupled in parallel with the ultracapacitor and which is coupled and de-coupled with that fuel cell.

24. A fuel cell power system in accordance with claim 21, wherein each ultracapacitor has an operating voltage range, and wherein at least one of the fuel cells is defined by a plurality of fuel cell subsystems which are electrically coupled together in series and which, when coupled to an ultracapacitor, produces a cumulative DC voltage within the operating range of the ultracapacitor.

25. A fuel cell power system in accordance with claim 21, wherein at least one of the ultracapacitors is configured to operate in a voltage range of about 1.8 to about 2.2 Volts DC, and wherein a fuel cell is defined by a plurality of fuel cell subsystems which are electrically coupled together in series, and which each produce a voltage of about 0.6 Volts DC.

26. A fuel cell power system in accordance with claim 21, wherein respective fuel cells are defined by a plurality of fuel cell subsystems, each comprising an ion exchange membrane.

27. A fuel cell power system in accordance with claim 21, and further comprising:
one or more additional fuel cells electrically coupled in parallel with one of the fuel cells.

28. A fuel cell power system comprising:
a plurality of fuel cells, each fuel cell being defined by a plurality of fuel cell subsystems which are electrically coupled together in series, each fuel cell subsystem, in operation, producing direct current electrical energy;
a plurality of ultracapacitors, the ultracapacitors being associated with respective fuel cells, each ultracapacitor having a DC voltage condition;
a switch electrically coupled to each fuel cell to selectively electrically couple the fuel cell to its associated ultracapacitor; and
control circuitry to cause the switches, for each fuel cell, to electrically couple the fuel cell to the associated ultracapacitor in response to the DC voltage of that ultracapacitor being less than a first predetermined DC voltage, and to electrically de-couple the fuel cell from the associated ultracapacitor in response to the voltage of that ultracapacitor being greater than a second predetermined DC voltage, the control circuitry further causing the switches to couple and de-couple the ultracapacitors to and from a load having an AC voltage demand at different times, the times and number of ultracapacitors electrically coupled to the load at any of those times being selected by the control circuitry so as to approximate an AC voltage sine wave.

29. A fuel cell power system in accordance with claim 28, and further comprising a battery electrically coupled in parallel with each ultracapacitor, and wherein each battery has a maximum DC voltage, and wherein each ultracapacitor has an operating voltage range, and wherein, for each fuel cell, the cumulative voltage of the plurality of fuel cell subsystems electrically coupled together to define the fuel cell is within the operating DC voltage range of the associated ultracapacitor, and less than the maximum DC voltage of the battery electrically coupled in parallel with the associated ultracapacitor.

30. A fuel cell power system in accordance with claim 28, wherein the fuel cell subsystems of one of the fuel cells each produce about the same DC voltage, when operating.

31. A fuel cell power system in accordance with claim 28, wherein each ultracapacitor has an operating voltage range, and wherein the associated fuel cell produces a DC voltage within the operating voltage range of the ultracapacitor.

32. A fuel cell power system in accordance with claim 28, and further including, for at least one of the ultracapacitors, a second plurality of fuel cell subsystems which are electrically coupled together in series, and wherein the second plurality of fuel cell subsystems is in parallel with the first plurality of fuel cell subsystems associated with that ultracapacitor.

33. A fuel cell power system in accordance with claim 28, wherein at least one of the ultracapacitors has an operating voltage of 1.8 to 2.2 Volts DC, and wherein the associated fuel cell has exactly three fuel cell subsystems that produce a cumulative voltage of about 1.8 Volts DC, when operating.

34. A fuel cell power system in accordance with claim 28, wherein each fuel cell subsystem comprises an ion exchange membrane.

35. A fuel cell power system as claimed in claim 28, wherein the control circuitry comprises an embedded processor.

36. A method of operating a fuel cell power system, comprising:
providing a plurality of fuel cells which, in operation, respectively produce direct current electrical energy;
providing a plurality of ultracapacitors, each ultracapacitor having a DC voltage condition;
electrically coupling a fuel cell to an ultracapacitor when the voltage of that ultracapacitor is less than a first predetermined DC voltage, and electrically de-coupling the fuel cell from the ultracapacitor when the voltage of that ultracapacitor is greater than a second predetermined DC voltage; and
selectively coupling and de-coupling the individual ultracapacitors to and from a load having an AC voltage demand at different times, the times and number of ultracapacitors electrically coupled to the load at any of those times being selected so as to approximate an AC voltage sine wave.

37. A method in accordance with claim 36, and further comprising electrically coupling a battery in parallel with each ultracapacitor.

38. A method in accordance with claim 36, and further comprising electrically coupling a plurality of fuel cell subsystems together in series to define each of the fuel cells.

39. A method in accordance with claim 38, and further comprising electrically coupling a single cell battery in parallel with each ultracapacitor, and which has a maximum DC voltage, the method further comprising selecting the number of fuel cell subsystems of each fuel cell such that the combined DC voltage of the fuel cell subsystems of each fuel cell is no greater than the maximum voltage of the battery which is electrically coupled in parallel with the ultracapacitor and to which that fuel cell is coupled and decoupled.

40. A method in accordance with claim 39, wherein each ultracapacitor has an operating voltage range, and wherein the fuel cell subsystems which are electrically coupled together in series for each fuel cell are selected so as to produce a cumulative DC voltage which lies within the operating voltage range of the ultracapacitor to which the fuel cell is coupled and decoupled.

41. A method in accordance with claim 40, wherein selectively coupling and de-coupling the respective ultracapacitors to and from the load at different times comprises electrically coupling ultracapacitors in series in a predetermined sequence and de-coupling ultracapacitors in a predetermined sequence.

42. A method in accordance with claim 36, wherein at least one of the ultracapacitors has an operating voltage of about 1.8 to about 2.2 Volts DC, and wherein the method further comprises:
defining a fuel cell using a plurality of fuel cell subsystems which are electrically coupled together in series, and wherein each of the fuel cell subsystems produces a voltage of about 0.6 Volts DC.

43. A method of distributing electrical AC power, which is generated by a fuel cell power system, to a load, comprising:
defining a plurality of fuel cells by electrically coupling a plurality of fuel cell subsystems together in series to define each fuel cell;
providing a plurality of ultracapacitors, the ultracapacitors being associated with respective fuel cells, and each ultracapacitor having a DC voltage condition;
providing a switch associated with each fuel cell, and which selectively electrically couples the fuel cell to its associated ultracapacitor; and selectively controlling the switches to electrically couple a fuel cell to the associated ultracapacitor when the DC voltage of that ultracapacitor is less than a first predetermined DC voltage, and to electrically de-couple the fuel cell from the associated ultracapacitor when the DC voltage of that ultracapacitor is greater than a second predetermined voltage, and further causing the switches to couple and de-couple the respective ultracapacitors to and from a load having an AC voltage demand at different times, the times and number of ultracapacitors which are electrically coupled to the load at any of those times being selected by the control circuitry so as to approximate an AC voltage sine wave which provides at least a portion of the AC voltage demand of the load.

44. A method in accordance with claim 43, wherein the fuel cell subsystems of at least one of the fuel cells each produce about the same DC voltage.

45. A method in accordance with claim 43, and further comprising using a processor to selectively control the switches.

46. A method in accordance with claim 43, wherein each ultracapacitor has a maximum DC voltage, and the method further comprises, for each fuel cell, selecting the number of fuel cell subsystems to be electrically coupled together in series for that fuel cell such that the combined DC voltage produced by the fuel cell subsystems electrically coupled together in series is expected to be less than the maximum DC voltage of the associated ultracapacitor.

47. A method in accordance with claim 43, wherein at least one of the ultracapacitors has an operating voltage of about 1.8 to about 2.2 Volts DC.

48. A method in accordance with claim 43, wherein at least one of the ultracapacitors has an operating voltage of about 1.8 to about 2.2 Volts DC, and a maximum voltage which is greater than about 2.2 Volts DC, and wherein the method further comprises electrically coupling together in series, for the associated fuel cell, three fuel cell subsystems that together produce a voltage of about 1.8 Volts when operating.

49. A method in accordance with claim 43, wherein each fuel cell subsystem comprises an ion exchange membrane.

50. A method in accordance with claim 43, and further comprising electrically coupling a battery in parallel with each ultracapacitor, and wherein the battery is a single cell battery having a voltage of about 2 Volts DC.

51. A fuel cell power system, comprising:

a fuel cell which generates a D.C. voltage output while operating;

a load which has an A.C. voltage demand;

a plurality of energy storage devices each having a D.C. voltage condition and which, in operation, are selectively electrically coupled with the load having the A.C. voltage demand; and circuitry which, in operation, substantially simultaneously and selectively electrically couples and decouples the D.C. voltage output of the fuel cell to the individual energy storage devices based upon the D.C. voltage condition of the respective energy storage devices, and further selectively electrically couples and decouples the respective energy storage devices to the load having the A.C. voltage demand in a manner which approximates an A.C. sine wave to meet the A.C. voltage demand of the load.

* * * * *